(12) United States Patent
Collier

(10) Patent No.: US 7,527,299 B1
(45) Date of Patent: May 5, 2009

(54) CONTAINER DISCHARGE AND FILL PORT FITTING

(76) Inventor: William Shawn Collier, P.O. Box 98, Sprague River, OR (US) 97639

( * ) Notice: Subject to any disclaimer, the term of this patent is extended or adjusted under 35 U.S.C. 154(b) by 0 days.

(21) Appl. No.: 11/633,841

(22) Filed: Dec. 5, 2006

Related U.S. Application Data

(60) Provisional application No. 60/742,415, filed on Dec. 6, 2005.

(51) Int. Cl.
*F16L 27/00* (2006.01)
(52) U.S. Cl. .............................. 285/139.3; 285/148.25; 285/205; 285/208
(58) Field of Classification Search .............. 285/139.1, 285/139.2, 139.3, 148.25, 205–206, 208
See application file for complete search history.

(56) References Cited

U.S. PATENT DOCUMENTS

| | | | | |
|---|---|---|---|---|
| 2,528,919 A | * | 11/1950 | Stone et al. ............... | 285/139.3 |
| 2,736,577 A | | 2/1956 | Mackey | |
| 2,757,025 A | | 7/1956 | Noyes | |
| 2,893,756 A | | 7/1959 | Sundstrom | |
| 3,089,654 A | | 5/1963 | Voudy | |
| 3,181,899 A | | 5/1965 | McKnight, Jr. | |
| 3,246,132 A | | 4/1966 | Jordan | |
| 3,401,958 A | * | 9/1968 | Demyon ..................... | 285/208 |
| 4,281,895 A | * | 8/1981 | Mohr ......................... | 359/827 |
| 4,377,291 A | * | 3/1983 | Albertini .................... | 277/619 |
| 5,295,760 A | * | 3/1994 | Rowe ......................... | 405/52 |
| 5,826,919 A | | 10/1998 | Bravo | |
| 5,904,377 A | | 5/1999 | Throup | |
| 5,967,567 A | | 10/1999 | Nordstrom | |
| 5,971,444 A | * | 10/1999 | Hawkins .................... | 285/206 |
| 6,508,490 B1 | | 1/2003 | Hoffman | |

* cited by examiner

*Primary Examiner*—Aaron M Dunwoody
*Assistant Examiner*—Fannie Kee

(57) ABSTRACT

Attaching a fitting having a conduit in a port of a container. A sleeve forming a conduit has a flange adjacent one end and has a groove in an exterior wall. A gasket and a pressure plate is slidably positioned on the sleeve. A securing plate has threaded bolts therein and is slidably positioned on the sleeve to position one end of the bolts to engage the pressure plate. A securing element is positioned in the groove and disposed in the securing plate to prevent the securing plate from sliding off of the sleeve when the bolts are tightened against the pressure plate.

5 Claims, 2 Drawing Sheets

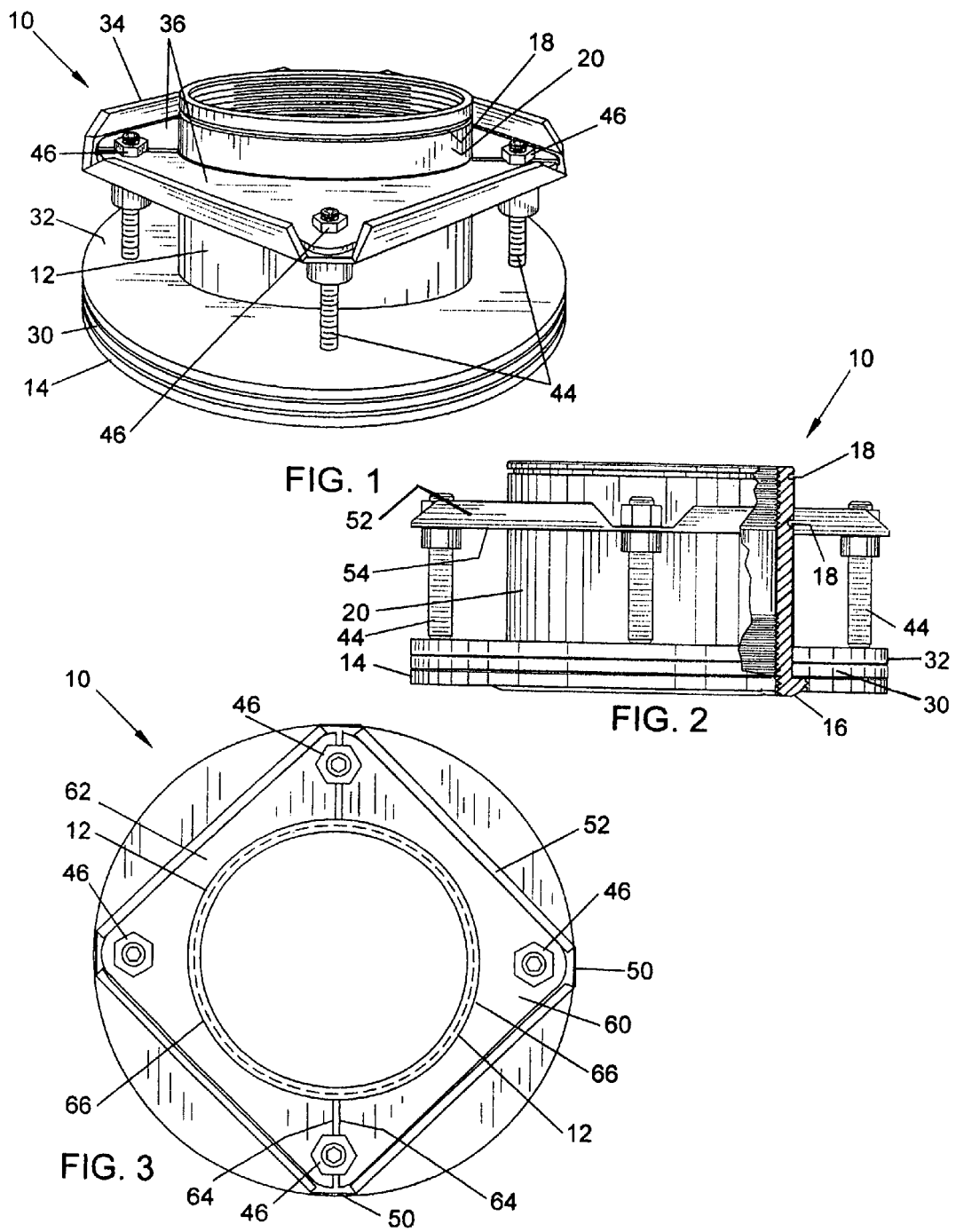

US 7,527,299 B1

CONTAINER DISCHARGE AND FILL PORT FITTING

This application claims the benefit of U.S. Provisional Application 60/742,415 filed on Dec. 6, 2005

BACKGROUND OF THE INVENTION

This invention relates to devices for attaching a fitting having a conduit in an opening, port, aperture or the like of a container to position and seal the conduit for use in discharging and filling the container. The new container port fitting device may use a pressure securing device that may not require bolt holes or other container penetration to seal the fitting to the container wall around the opening or port.

Discharge and fill pipe, faucet or other container opening fittings may be attached to the wall of a container using various devices. The aperture in a container may have a short pipe attached and sealed to pass through the aperture to allow connecting hoses, pipes, caps or other devices associated with the flow of fluids into and out of the container. A short pipe or hollow cylindrical element may have a flange, a rubber seal and a compressing washer or disk that may allow fastening and sealing the pipe in the container aperture. The general practice may be to provide bolt apertures in the container wall adjacent the port or aperture to allow bolts to pass through the wall and be tightened to press the flange and compression washer against opposite sides of the container wall.

Other attachment devices may use a fill pipe with external threads to allow a large nut fitting to be threadably attached and tightened. Devices that may use snap rings in an annular groove of a sleeve having a flange may also be known for use in providing a conduit in an opening of a sink or container. This type of device may not be suitable for a pressure seal container port fitting. The use of bolt apertures as described above also may allow more rapid deterioration of a port surrounding wall or the port fitting that may allow leaking of fluids and corrosion of surrounding elements.

SUMMARY OF THE INVENTION

The present invention is directed to devices for attaching a fitting having a conduit in a port of a container. A sleeve forming a conduit may have a flange adjacent one end and may have a groove in an exterior wall. A gasket and a pressure plate may be slidably positioned on the sleeve. A securing plate may have threaded bolts therein and may be slidably positioned on the sleeve to position one end of the bolts to engage the pressure plate. A securing element may be positioned in the groove and disposed in the securing plate to prevent the securing plate from sliding off of the sleeve when the bolts may be tightened against the pressure plate.

These and other features, aspects and advantages of the present invention will become better understood with reference to the following drawings, description and claims.

BRIEF DESCRIPTION OF THE DRAWINGS

FIG. 1 illustrates a side perspective elevation view of a port fitting according to an embodiment of the invention;

FIG. 2 illustrates a side elevation view of a port fitting according to an embodiment of the invention;

FIG. 3 illustrates an end view of a port fitting according to an embodiment of the invention;

DETAILED DESCRIPTION

Figure 4:
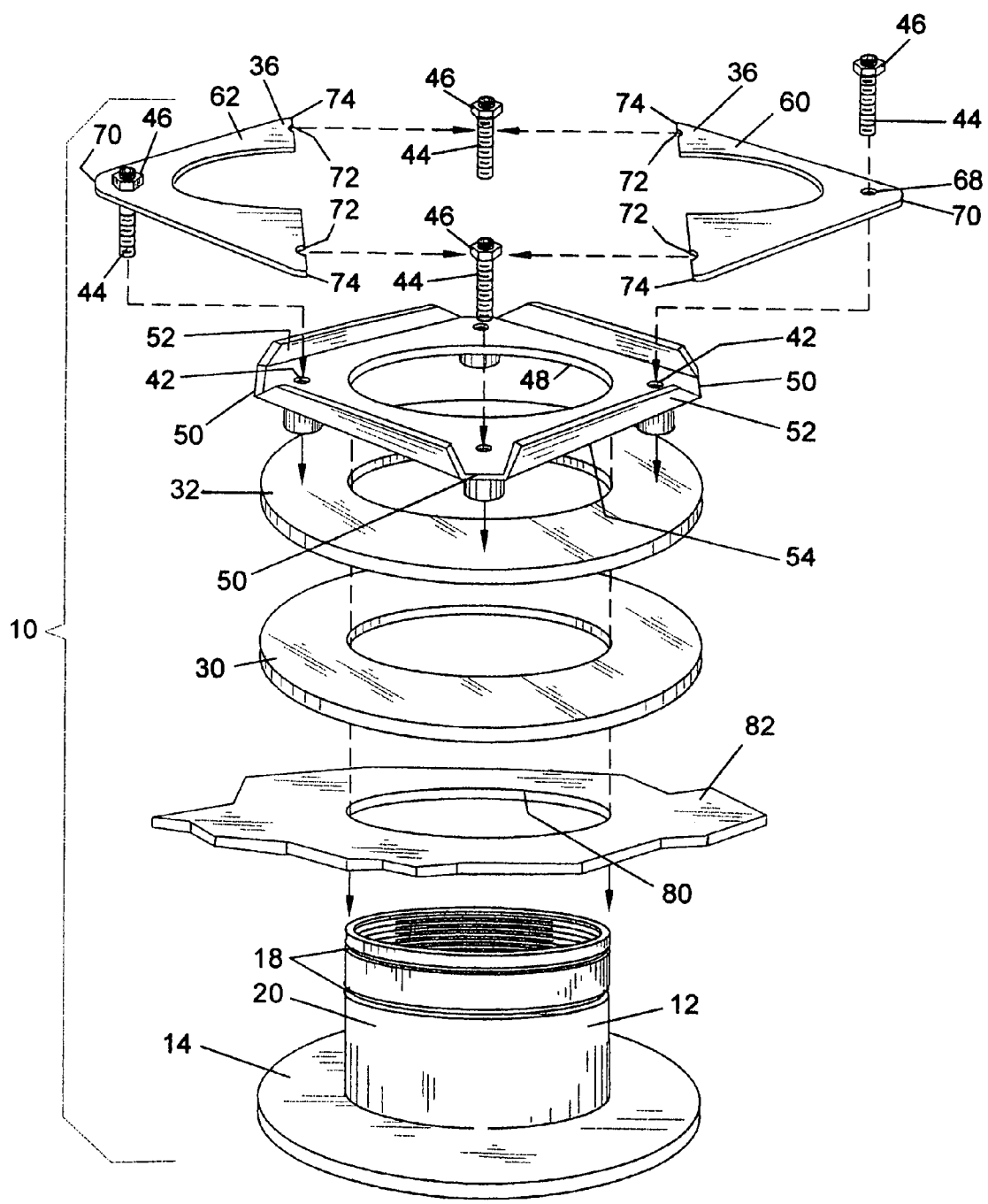
FIG. 4 illustrates a perspective exploded view of a port fitting according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 4; a container discharge and fill port fitting 10 may have a cylindrical hollow sleeve 12, conduit, pipe or the like with a flange 14 adjacent a first end 16. There may be one or more annular grooves 18 formed in the exterior wall 20 of the sleeve 12. The sleeve 12 may be insertable through a port 80, aperture, hole or the like formed in the wall 82 of a container (not shown). The flange 14 may abut one side of the wall 82.

A gasket 30 formed of rubber, polyfoam, synthetic material, composite material or the like may be slidably disposed on the sleeve 12 to abut a wall 82 on the opposite side from the flange 14. A pressure ring 32 or washer may be slidably disposed on the sleeve 12 to abut the gasket 30.

There may be a securing plate 34 and a securing element 36 that may be structured as a split element. The securing plate 34 may have threaded apertures 42 for threaded bolts 44 to be rotated against pressure ring 32. The securing plate 34 may be restrained on the sleeve 12 against the force of the bolts 44 by the securing element 36 that may engage one of the grooves 18. Adjustment of the bolts 44 may apply pressure against pressure ring 32 to urge the flange 14, the gasket 30, and the pressure ring 32 combination together. This may seal the port fitting 10 around a port 80 with a sleeve 12 inserted therethrough.

While rings and circular elements have been disclosed, other geometric shapes may be used depending on the container application, for example, rectangular, non-circular or other cross-sectional shapes. The port fitting 10 elements may be formed of stainless steel, metal, plastic, composites or other material depending on the container application and parameters such as pressure sealing requirements.

The securing plate 34 may be rectangular in form with a threaded aperture 42 positioned adjacent each corner 50. There may be a generally perpendicular side wall 52 at each edge 54 of the securing plate 34 for use in retaining the securing element 36 relative to the securing plate 34. The securing plate 34 may have an aperture 48 centrally positioned for disposing the securing plate 34 on the sleeve 12.

A securing element 36 may be formed of a first plate 60 and a second plate 62 that may be generally rectangular in shape to be disposed on securing plate 34 with groove edges 64 mating to form a rectangular shape. The plates 60, 62 may have semicircular openings 66 in the groove edges 64 sized to be disposed in a groove 18. While the plates 60, 62 may have openings 66 disposed in a groove 18 and may be disposed on securing plate 34, the side walls 52 may retain the plates 60, 62 in a groove 18.

The plates 60, 62 may each have an aperture 68 adjacent the corner 70 opposite the groove edge 64. There may also be a notch 72 adjacent each corner 74 of the groove edge 64 such that when the plates 60, 62 abut the notches 72 may form apertures. The apertures 68 and notches 72 may allow the bolts 44 to pass through the securing element 36. When the bolts 44 may be rotated to seal the port fitting 10 to a wall 82, nuts 46 may be tightened on the bolts 44 against the securing element 36 to maintain the bolts 44 in position and to further secure the securing element 36.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device for attaching a fitting having a conduit in a port of a container comprising:
    a sleeve forming a conduit having a flange adjacent a first end and a groove formed in an exterior wall of said sleeve;
    a gasket slidably disposed on said sleeve intermediate said flange and a pressure plate slidably disposed on said sleeve;
    a securing plate having a plurality of threaded apertures therein and a plurality of side walls attached at each edge of said securing plate approximately perpendicular to a plane of said plate wherein said plate having an aperture formed to slidably dispose said plate on said sleeve;
    a securing element formed of a first plate having a first groove edge with a first opening therein sized to be disposed in a portion of said groove and a second plate having a second groove edge with a second opening therein sized to be disposed in a portion of said groove;
    said first plate having a first aperture opposed said first groove edge and a first notch adjacent each first groove edge corner, and said second plate having a second aperture opposed said second groove edge and a second notch adjacent each second groove edge corner; and
    said securing element disposed in said securing plate with a threaded bolt passing through said first aperture, said second aperture, said first notches and said second notches, and said bolts threadably disposed in each of said threaded apertures to abut at one end to said pressure plate.

2. The device as in claim 1 wherein said sleeve is a hollow cylindrical sleeve, said grooves are annular grooves, said gasket and said pressure plate are of a circular form, said securing plate aperture is a circular aperture, and said first groove edge and said second groove edge openings are of semicircular form.

3. The device as in claim 1 wherein said securing plate and said securing element are of generally rectangular form, said threaded apertures are disposed adjacent each corner of said securing plate, and said first aperture and said second aperture disposed adjacent a first corner opposed said first groove edge and adjacent a second corner opposed to said second groove edge.

4. The device of claim 1 wherein said first groove edge and said second groove edge abut when said securing element is said securing plate.

5. The device of claim 1 wherein a nut is threadably disposed on said bolts abutting said securing element.

* * * * *